US006862670B2

United States Patent
Henry et al.

(10) Patent No.: US 6,862,670 B2
(45) Date of Patent: Mar. 1, 2005

(54) TAGGED ADDRESS STACK AND MICROPROCESSOR USING SAME

(75) Inventors: G. Glenn Henry, Austin, TX (US); Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 364 days.

(21) Appl. No.: 10/227,570

(22) Filed: Aug. 22, 2002

(65) Prior Publication Data

US 2003/0079115 A1 Apr. 24, 2003

Related U.S. Application Data

(60) Provisional application No. 60/345,452, filed on Oct. 23, 2001.

(51) Int. Cl.[7] .............................................. G06F 12/00
(52) U.S. Cl. ........................ 711/154; 711/117; 711/118; 711/132; 711/133
(58) Field of Search ................................ 711/117, 118, 711/132, 133, 154

(56) References Cited

U.S. PATENT DOCUMENTS 5,584,003 A * 12/1996 Yamaguchi et al. ........... 711/3
5,740,416 A * 4/1998 McMahan ................... 712/238
5,835,967 A * 11/1998 McMahan ................... 711/213
5,987,561 A * 11/1999 Witt et al. ...................... 711/3
6,021,471 A * 2/2000 Stiles et al. ................. 711/140
6,594,728 B1 * 7/2003 Yeager ........................ 711/127

* cited by examiner

*Primary Examiner*—T Nguyen
(74) *Attorney, Agent, or Firm*—E. Alan Davis; James W. Huffman (57) ABSTRACT

A tag address stack (TAS) for reducing the number of address latches and address comparators needed to insure data coherency in a pipelined microprocessor. The TAS is a small pool of address latches shared among data buffers in the microprocessor that stores a unique set of memory addresses that specify data in the data buffers. A correspondingly small number of address comparators compare the unique TAS addresses with a new load/store address. If the new address matches a TAS address, the new load/store operation latches a unique tag associated with the matching TAS address. Otherwise, the new address is loaded into a free latch and the new load/store latches its associated unique tag. If no latches are free, the pipeline stalls until a latch in the pool becomes free. Rather than storing the full addresses in conjunction with the data buffers, the tags are stored, which facilitates faster compares.

34 Claims, 4 Drawing Sheets

Microprocessor with Tagged Address Stack

FIG. 1 (Related Art)

Conventional Microprocessor

Microprocessor with Tagged Address Stack

Tagged Address Stack Operation

FIG. 5

CASE 1:
matching new address new address = 0x4444444

| Tag | TAS Contents | Active/Free |
|---|---|---|
| 0 | 0x1234567 | A |
| 1 | 0x2222222 | A |
| 2 | 0x4444444 | A |
| 3 | 0x7777777 | A |
| 4 | 0x7654321 | A |
| 5 | X | F |
| 6 | 0x1212121 | A |
| 7 | X | F | match[2] = TRUE
match[0:1,3:7] = FALSE
update = FALSE
tag = 2
stall = FALSE

CASE 2:
non-matching new address;
TAS entry free new address = 0x6666666

| Tag | TAS Contents | Active/Free |
|---|---|---|
| 0 | 0x1234567 | A |
| 1 | 0x2222222 | A |
| 2 | 0x4444444 | A |
| 3 | 0x7777777 | A |
| 4 | 0x7654321 | A |
| 5 | X | F |
| 6 | 0x1212121 | A |
| 7 | X | F | match[0:7] = FALSE
update = TRUE
tag = 5
stall = FALSE

CASE 3:
non-matching new address;
no TAS entries free new address = 0x6666666

| Tag | TAS Contents | Active/Free |
|---|---|---|
| 0 | 0x1234567 | A |
| 1 | 0x2222222 | A |
| 2 | 0x4444444 | A |
| 3 | 0x7777777 | A |
| 4 | 0x7654321 | A |
| 5 | 0x5555555 | A |
| 6 | 0x1212121 | A |
| 7 | 0x3333333 | A | match[0:7] = FALSE
update = FALSE
tag = X
stall = TRUE

*Tagged Address Stack Operation*

US 6,862,670 B2

TAGGED ADDRESS STACK AND MICROPROCESSOR USING SAME

This application claims priority based on U.S. Provisional Application, Ser. No. 60/345452, filed Oct. 23, 2001, entitled SINGLE BIT DECODED TAG ADDRESS COMPARISON MEMORY ARCHITECTURE-CXA.

FIELD OF THE INVENTION

This invention relates in general to the field of address comparison in microprocessors, and more particularly to an apparatus that reduces the number of address latches and comparators necessary to ensure data coherency and ordering.

BACKGROUND OF THE INVENTION

Modern microprocessors operate internally similar to an assembly line in an automobile factory. An assembly line includes various stages, each performing a different function needed to assemble a car. Similarly, microprocessors include several stages connected together to form what is commonly referred to as a pipeline. Each stage in the pipeline performs a different function needed to execute a software program instruction.

In the assembly line, multiple cars follow one another down the line and move through the line simultaneously, with each car being at a different stage of assembly. This aspect of the assembly line enables it to produce more cars per day than a factory that doesn't start assembling another car until the current car is fully assembled. Similarly, multiple instructions follow one another down the microprocessor pipeline simultaneously, with each instruction being executed in part by a different stage of the pipeline. Pipelined microprocessors are capable of executing more instructions per second than non-pipelined processors.

Two predominant instructions executed by microprocessors are load and store instructions. A load instruction loads data from memory into the microprocessor. A store instruction stores data from the microprocessor to memory. Load and store instructions may exist at different stages of the pipeline simultaneously as described above, and it is desirable for them to do so because it is beneficial to performance.

In addition, transfers of data from or to memory required by load and store instructions typically take longer than the time required to perform non-memory transfer instructions, such as an add instruction. This could be detrimental to performance if other instructions in the pipeline behind a load or store that could otherwise complete were required to wait in the pipeline until the load/store memory transfer completed. To avoid this problem, microprocessors employ data buffers, or data latches.

Some data buffers, commonly referred to as write buffers, are used to hold data until it can be written to memory on the microprocessor bus that connects the microprocessor to memory. Other data buffers, commonly referred to as store buffers, are used to hold data until it can be written to cache memory. Other data buffers, commonly referred to as fill buffers, or response buffers, are allocated for receiving data from memory on the processor bus to be provided to functional units within the microprocessor. Still other data buffers, commonly referred to as replay buffers, are used to temporarily hold data as it flows through various stages of the pipeline until it reaches a write buffer or store buffer, or to temporarily hold load data as it flows through various stages of the pipeline after having been delivered to a pipeline functional unit from a fill buffer.

Although it is desirable to buffer load/store data and allow multiple loads and/or stores to be pending in the pipeline simultaneously, the microprocessor must ensure data coherency and proper ordering of data transfers on the microprocessor bus. For example, if a load instruction to an address in memory follows a store instruction to the same address, the microprocessor must ensure that the load instruction receives the data of the store instruction rather than the data currently in memory at the address. That is, the contents of memory at the address is not the newest data because the store instruction has newer data associated with the memory address, but the new data has not yet been written to memory. Hence, the microprocessor must either wait for the new data to be written to memory and then retrieve it from memory for the load instruction, or the microprocessor must internally supply the new data from the store instruction to the load instruction.

Regardless of which way the microprocessor chooses to provide the new data to the load instruction, one thing is clear: at some point after the load instruction enters the pipeline, the microprocessor must compare the load address with all store addresses pending in buffers in the pipeline ahead of the load in order to determine whether the load address matches any of the store addresses. Other situations besides the example of the load following a store described above require address comparison in order to ensure data coherency.

In a modern microprocessor, it is not uncommon to have several tens of data buffers for handling load and store instructions simultaneously to improve performance. Each data buffer also includes an associated address latch, or buffer, for storing the associated load address or store address. As the number of data buffers and associated address latches increases, so must the number of address comparators increase to determine whether an address match has occurred in order to insure data coherency. The size of the addresses is typically on the order of 32 bits or more. Consequently, the amount of area consumed on the microprocessor integrated circuit by the address latches and comparators may be significant. Additionally, the complexity of the control logic needed for ensuring data coherency based on the address comparator results increases exponentially as the number of comparators increases.

Therefore, what is needed is a solution to the problem created by the large number of address latches and address comparators used to ensure data coherency in microprocessors with large numbers of data buffers.

SUMMARY

The present invention provides a microprocessor that recognizes the fact that during any period of time a relatively small number of unique load/store addresses are present in a microprocessor pipeline, and consequently uses a common pool of address latches that are shared among the data buffers, the shared pool being much smaller than the number needed in conventional microprocessors that have an address latch dedicated to each data buffer. Because the shared pool of address latches is smaller, the microprocessor consequently requires only as many address comparators as the number of address latches in the shared pool. Accordingly, in attainment of the aforementioned object, it is a feature of the present invention to provide an apparatus for reducing the number of address latches and address comparators needed to maintain data coherency in a microprocessor pipeline. The apparatus includes a tagged address stack (TAS) having N latches that store up to N unique addresses associated with data buffers in the pipeline. Each of the N latches has an associated unique TAS tag. The apparatus also includes N address comparators, coupled to the TAS, that indicate which if any of the N unique addresses matches a new address associated with a new data transaction in the pipeline. The apparatus also includes control logic, coupled to the N address comparators. If the N address comparators indicate the new address does not match any of the N unique addresses, then the control logic allocates a free one of the N latches to store the new address into and causes the new data transaction to latch the unique TAS tag associated with the free one of the N latches allocated.

In another aspect, it is a feature of the present invention to provide a microprocessor. The microprocessor includes a plurality of data buffers that store data specified by load/store addresses. The microprocessor also includes a tag address stack (TAS), coupled to the plurality of data buffers, that has N entries for storing N unique ones of the load/store addresses. Each of the N entries is identified by one of N unique tags. The microprocessor also includes a plurality of tag latches, coupled to the TAS, correspondent with the plurality of data buffers. Each of the plurality of tag latches stores one of the N unique tags. The microprocessor also includes a plurality of tag comparators, coupled to the plurality of tag latches, which compare the N unique tags stored in the plurality of tag latches.

In another aspect, it is a feature of the present invention to provide a method for achieving data coherency in a microprocessor. The method includes comparing a new memory address with a set of memory addresses. The set is a predetermined size. Each of the memory addresses in the set is unique. A unique tag is associated with each location in the set. The method also includes stalling the microprocessor in response to the comparing if the new memory address does not match any of the memory addresses in the set and all of the memory addresses in the predetermined size set are active. The method also includes inserting the new memory address into the set in response to the comparing if the new memory address does not match any of the memory addresses in the set but at least one of the memory addresses in the set is not active. The method also includes binding to the new memory address the unique tag associated with the location in the set of a matching one of the memory addresses in response to the comparing, if the new memory address matches one of the memory addresses.

In another aspect, it is a feature of the present invention to provide a microprocessor having M data buffers for storing data associated with data transfer operations to or from a memory address. The microprocessor includes an array of N address latches, shared in common by the M data buffers, which store N unique memory addresses associated with the data transfer operations. N is substantially smaller than M. The microprocessor also includes N address comparators, coupled to the array, that compare the N unique memory addresses with a new memory address of a new data transfer operation. The microprocessor also includes control logic, coupled to the N address comparators, that stalls the new data transfer operation until one of the N address latches in the array becomes free, if the control logic determines from the N address comparators that the new memory address is an N+1th unique memory address.

An advantage of the present invention is that it reduces the number of address latches and address comparators required to insure data coherency over a conventional microprocessor. Another advantage is that the control logic interpreting the comparator results is simpler since fewer results must be examined. Consequently, timing advantages may be obtained. Yet another advantage of the present invention is that because the present invention enables fast comparison of small tags rather than slower full memory address comparisons, pipeline operation optimizations may be realized. All of these advantages are obtained in exchange for limiting the number of unique transaction addresses that may be outstanding at a time. However, the present inventors have observed that the number of unique addresses, i.e., the size of the TAS, may be selected such that performance is insignificantly impacted, if at all, and the number is relatively small.

Other features and advantages of the present invention will become apparent upon study of the remaining portions of the specification and drawings.

DETAILED DESCRIPTION

Before describing the present invention, it will be helpful to describe first a conventional microprocessor in order to more fully appreciate the features and advantages of the present invention.

Figure 1:
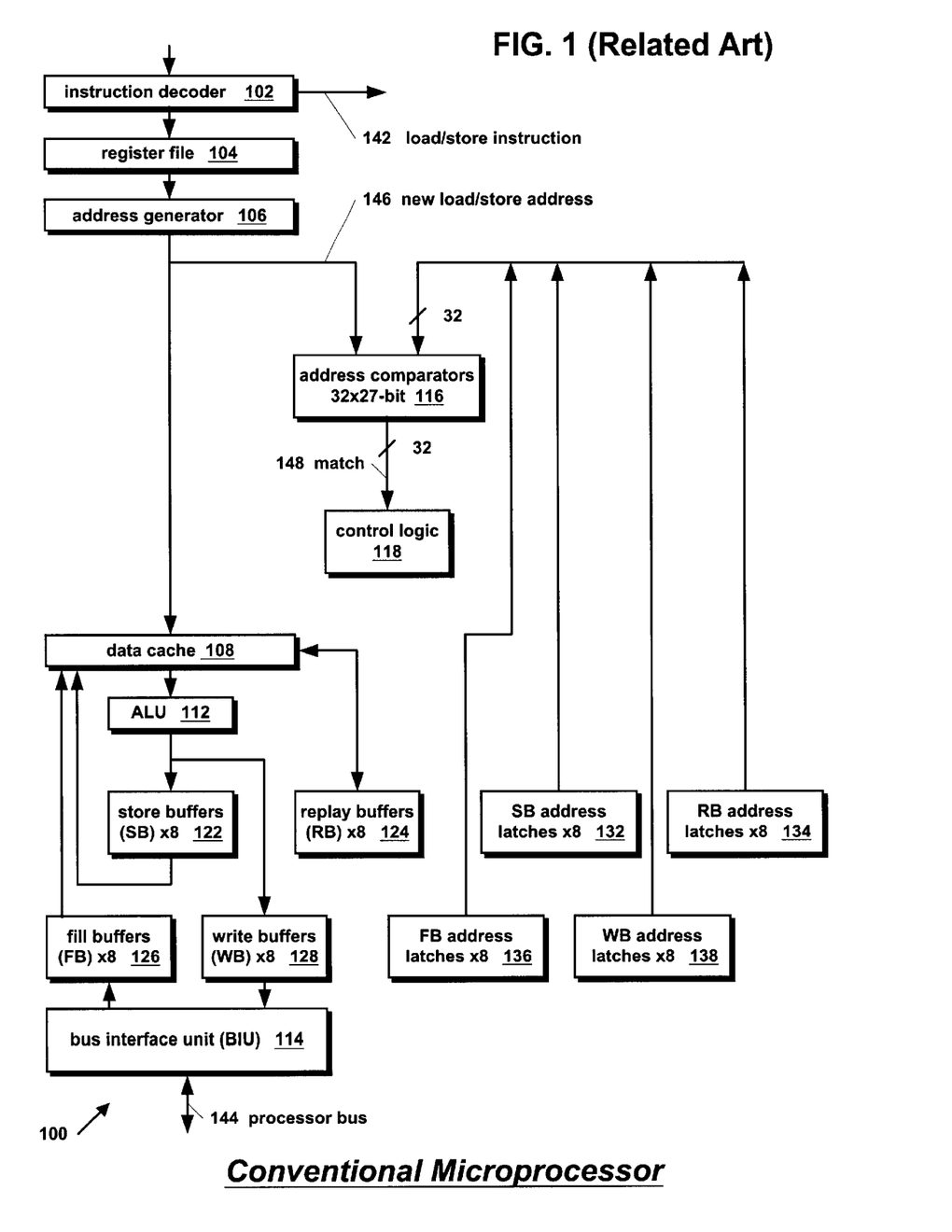
FIG. 1 is a block diagram of a related art microprocessor.

Referring now to FIG. 1, a block diagram of a related art microprocessor 100 is shown. The microprocessor 100 includes an instruction decoder 102. The instruction decoder 102 receives instructions from an instruction cache (not shown) and decodes the instructions. In particular, instruction decoder 102 decodes load and store instructions entering the microprocessor 100 pipeline. When the instruction decoder 102 decodes a load or store instruction, the instruction decoder 102 generates a true value on a load/store instruction signal 142.

The microprocessor 100 also includes a register file 104 coupled to the instruction decoder 102. Register file 104 comprises a plurality of registers. In particular, register file 104 includes registers used to receive data specified by load instructions. The registers also store data to be written to memory by store instructions. Additionally, register file 104 includes registers used to generate load and store addresses.

The microprocessor 100 also includes an address generator 106 coupled to register file 104. Address generator 106 generates memory addresses specified by instructions decoded by instruction decoder 102. In particular, address generator 106 generates a memory address of a load or store instruction 146. Address generator 106 generates the new load/store address 146 based on operands specified by the load or store instruction, some of which may be contained in registers of register file 104.

The microprocessor 100 also includes a data cache 108 coupled to address generator 106. Data cache 108 receives new load/store address 146 and looks up the new load/store address 146 to determine if the address 146 hits in the data cache 108.

The microprocessor 100 also includes an arithmetic logic unit (ALU) 112 coupled to data cache 108. ALU 112 performs arithmetic and logical operations on data supplied by the data cache 108, by registers in register file 104, or by the instructions themselves.

The microprocessor 100 also includes a plurality of store buffers (SB) 122 coupled to ALU 112. Store buffers 122 hold the store data until it can be written into data cache 108. FIG. 1 shows a representative microprocessor 100 with eight store buffers 122.

The microprocessor 100 also includes a plurality of write buffers (WB) 128 coupled to ALU 112. Write buffers 128 receive store data from ALU 112, data cache 108, or register file 104 and hold the store data until it can be written to memory (not shown). FIG. 1 shows a representative microprocessor 100 with eight write buffers 128.

The microprocessor 100 also includes a bus interface unit (BIU) 114 coupled to write buffers 128. BIU 114 interfaces the microprocessor 100 to a processor bus 144. The processor bus 144 couples the microprocessor 100 to devices external to microprocessor 100, such as memory controllers, system RAM, video RAM, I/O devices, or other microprocessors. BIU 114 receives store data from the write buffers 128 and writes the store data on the processor bus 144 to the external devices.

The microprocessor 100 also includes a plurality of fill buffers (FB) 126 coupled to BIU 114 and data cache 108. The fill buffers 126 receive load data from the BIU 114 received from the external devices, and hold the load data until it can be written into the data cache 108 or register file 104. FIG. 1 shows a representative microprocessor 100 with eight fill buffers 126.

The microprocessor 100 also includes a plurality of replay buffers (RB) 124 coupled to data cache 108. Replay buffers 124 temporarily hold store data as it flows through the microprocessor 100 pipeline until it reaches write buffers 128 or store buffers 122, or temporarily hold load data after being received from fill buffers 126. Replay buffers 124 are particularly useful in sub-pipelines of the main microprocessor 100 pipeline, such as if data cache 108 has its own sub-pipeline. FIG. 1 shows a representative microprocessor 100 with eight replay buffers 124.

The microprocessor 100 also includes a plurality of SB address latches 132. SB address latches 132 hold the store addresses associated with the store data held in store buffers 122. Microprocessor 100 includes eight SB address latches 132, one for each of the eight store buffers 122.

The microprocessor 100 also includes a plurality of WB address latches 138. WB address latches 138 hold the store addresses associated with the store data held in the write buffers 128. Microprocessor 100 includes eight WB address latches 138, one for each of the eight write buffers 128.

The microprocessor 100 also includes a plurality of FB address latches 136. FB address latches 136 hold the load addresses associated with the load data held in the fill buffers 126. Microprocessor 100 includes eight FB address latches 136, one for each of the eight fill buffers 126.

The microprocessor 100 also includes a plurality of RB address latches 134. RB address latches 134 hold the load or store addresses associated with the load or store data held in the replay buffers 124. Microprocessor 100 includes eight RB address latches 134, one for each of the eight replay buffers 124.

The microprocessor 100 also includes a plurality of address comparators 116 coupled to address generator 106, SB address latches 132, RB address latches 134, FB address latches 136, and WB address latches 138. The microprocessor 100 of FIG. 1 includes thirty-two address comparators 116. Each of address comparators 116 receives new load/store address 146. Additionally, each one of address comparators 116 receives a different one of the addresses stored in the thirty-two address latches 132–138. Microprocessor 100 detects load and/or store address collisions at the granularity of a cache line. The data cache 108 of microprocessor 100 is a representative data cache having 32-byte cache lines. Thus, the 27 most significant bits of the new load/store address 146 are compared with the addresses stored in the address latches 122–128. Hence, address comparators 116 are 27-bit comparators. Address comparators 116 generate thirty-two match signals 148 to indicate whether new load/store address 146 matches the compared data buffer address. If the new load/store address 146 matches the data buffer address compared, then the address comparator 116 generates a true value on its match signal 148. Otherwise, the address comparator 116 generates a false value on the match signal 148.

The microprocessor 100 also includes control logic 118 coupled to address comparators 116. Control logic 118 receives the match signals 148 and uses the match signals 148 to ensure data coherency of load and store instructions within the microprocessor 100. That is, control logic 118 uses match signals 148 to order the execution of load and store operations, or transactions, within the microprocessor 100 pipeline to ensure data coherency for proper program execution.

Figure 2:
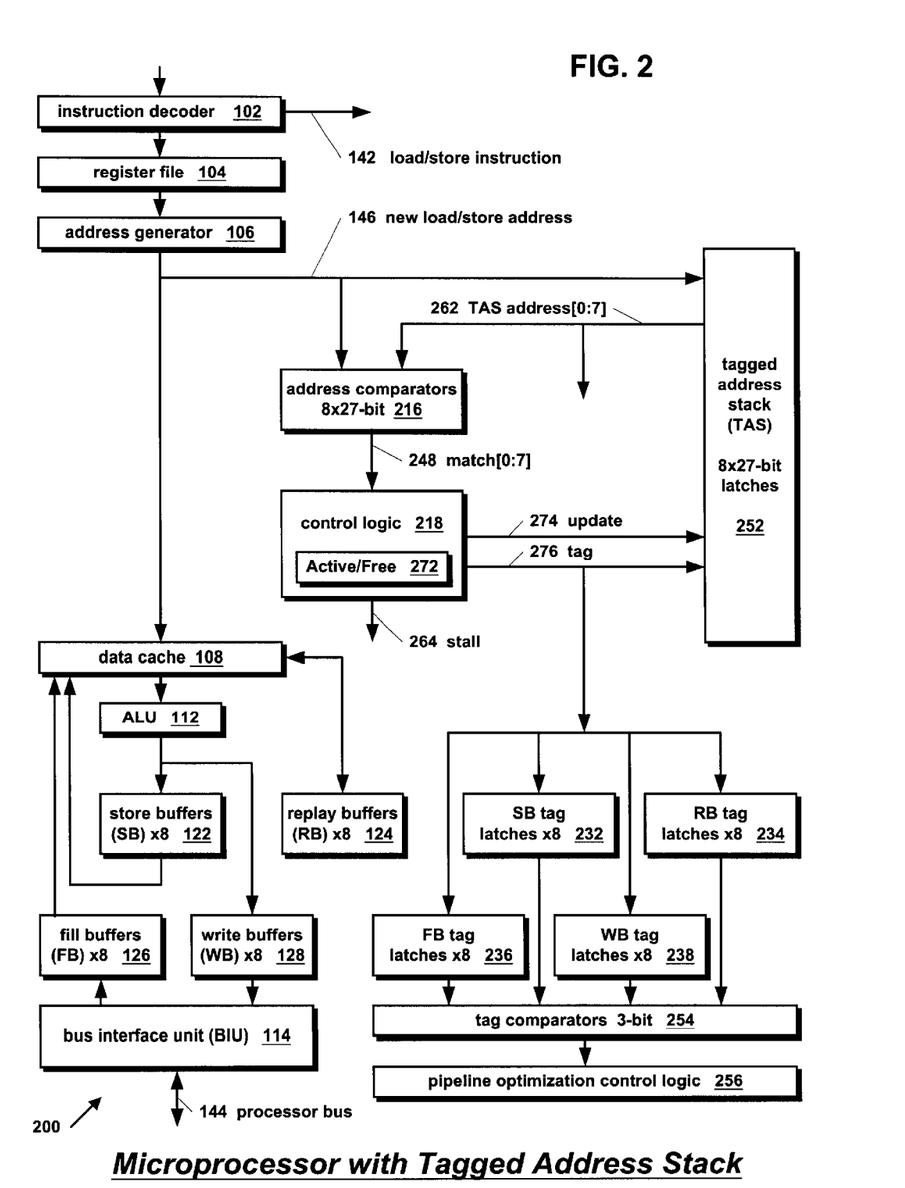
FIG. 2 is a block diagram of a microprocessor having a tagged address stack (TAS) according to the present invention.

Referring now to FIG. 2, a block diagram of a microprocessor 200 having a tagged address stack (TAS) 252 according to the present invention is shown. In one embodiment, microprocessor 200 is a pipelined microprocessor capable of decoding and executing instructions in an instruction set of x86 architecture microprocessors, such as the Intel® Pentium III® and Pentium IV®.

Portions of microprocessor 200 of FIG. 2 are similar to microprocessor 100 of FIG. 1 and are similarly numbered. In particular, instruction decoder 102, register file 104, address generator 106, data cache 108, ALU 112, store buffers 122, replay buffers 124, fill buffers 126, write buffers 128, BIU 114, and processor bus 144 are similar in microprocessor 100 and microprocessor 200.

However, microprocessor 200 of the present invention advantageously does not include the numerous address latches 132–138 of FIG. 1. Instead, microprocessor 200 includes a tagged address stack (TAS) 252. Additionally, microprocessor 200 includes address comparators 216 similar to address comparators 116; however, the number of address comparators 216 of microprocessor 200 is advantageously much fewer than the number of address comparators 116 of microprocessor 100, as described below.

The present inventors have observed that although a conventional microprocessor such as microprocessor 100 of FIG. 1 may have on the order of 30 data buffers 122–128, the address latches 132–138 associated with the data buffers 122–128 only contain between 1 and 6 unique cache line addresses at a given time. One analysis revealed that in a microprocessor similar to microprocessor 100, the maximum number of unique cache line addresses stored in the address latches 132–138 at any one time was 6, which occurred only 0.01% of the time.

Consequently, the present inventors have concluded that having so many address latches 132–138 and address comparators 116 wastes a large amount of space in the microprocessor 100. Furthermore, the present inventors have recognized that the control logic 118 in microprocessor 100 required for interpreting the large number of match signals 148 to maintain data coherency is costly in terms of timing and complexity. Therefore, the present inventors have replaced the address latches 132–138 and address comparators 116 of FIG. 1 with the TAS 252 which stores a smaller number of unique data buffer addresses and a corresponding number of address comparators 216 to compare the new load/store address 146 with the number of unique addresses stored in the TAS 252, as described below.

The TAS 252 comprises an array of address latches. In one embodiment, TAS 252 comprises an array of 8 address latches. The address latches in TAS 252 are also referred to as entries. Each latch has an associated tag, or index, to signify the latch's location in the array. In the embodiment with 8 entries, the tag is 3 bits. In addition, control logic 218 coupled to TAS 252 maintains an indication 272 of whether each of the entries in the TAS 252 holds a data buffer address that is active in the microprocessor 200 pipeline or whether the entry is free to be used for storing a new unique pipeline address.

The microprocessor 200 of the present invention includes a plurality of address comparators 216 coupled to address generator 106 and TAS 252. In one embodiment, microprocessor 200 includes 8 address comparators 216 for comparing the 8 unique data buffer addresses stored in the TAS 252. The 8 unique data buffer addresses stored in TAS 252 are denoted TAS addresses[0:7] 262, and are provided to address comparators 216. Address comparators 216 generate 8 match signals denoted match[0:7] 248 based on a comparison of each of the corresponding 8 TAS addresses[0:7] 262 with new load/store address 146.

Control logic 218 generates a 3-bit tag signal 276 based on the match signals 248 and the TAS entry active/free information 272 maintained by control logic 218. If the new load/store address 146 matches one of the active TAS addresses 262, then control logic 218 generates on tag signal 276 the binary value corresponding to the one of match signals 248 that has a true value. For example, if match signal[5] 248 is true and entry 5 in TAS 252 is active, then control logic 218 generates the binary value b'101 on tag signal 276. However, if none of the TAS addresses 262 matches the new load/store address 146, i.e., if all of match signals 248 are false, then control logic 218 generates on tag signal 276 a value corresponding to a free entry in TAS 252, if one exists.

If none of the TAS addresses 262 matches the new load/store address 146 and no TAS 252 entries are free, then control logic 218 generates a true value on a stall signal 264 to stall the microprocessor 200 pipeline. Control logic 218 stalls the pipeline because TAS 252 is full and no more unique data buffer addresses may proceed to data buffers. As discussed above, the size of TAS 252 is chosen such that the likelihood of a stall condition is very, very small, and consequently unlikely to harm performance. By limiting the number of unique outstanding load/store addresses simultaneously present in the pipeline and thereby potentially incurring a negligible, if any, performance impact, the present invention advantageously reclaims precious integrated circuit space by reducing the number of address latches and address comparators. The reduction in the number of address latches and comparators also reaps timing advantages by reducing the complexity of the control logic.

Control logic 218 also generates an update signal 274 based on the match signals 248 and the TAS active/free information 272 maintained by control logic 218. TAS 252 receives new load/store address 146. When the new load/store address 146 does not match any of the TAS addresses 262 and one of the TAS 252 entries is free, control logic 218 generates a true value on update signal 274 to write the new load/store address 146 into the TAS 252 entry specified by tag signal 276.

Microprocessor 200 also includes a plurality of tag address latches, namely SB tag latches 232, RB tag latches 234, FB tag latches 236, and WB tag latches 238. Each of the SB tag latches 232 stores the tag of the TAS 252 entry holding the memory address of the store data in a corresponding one of the store buffers 122. Each of the RB tag latches 234 stores the tag of the TAS 252 entry holding the memory address of the load/store data in a corresponding one of the replay buffers 124. Each of the FB tag latches 236 stores the tag of the TAS 252 entry holding the memory address of the load data in a corresponding one of the fill buffers 126. Each of the WB tag latches 238 stores the tag of the TAS 252 entry holding the memory address of the store data in a corresponding one of the write buffers 128.

The microprocessor 200 also includes a plurality of 3-bit tag comparators 254 coupled to the tag latches 232–238. The microprocessor 200 also includes pipeline optimization control logic 256 coupled to tag comparators 254. The tag comparators 254 compare various of the tags stored in the tag latches 232–238 and generate comparison results that are provided to the pipeline optimization control logic 256.

Advantageously, the present inventors have recognized that the microprocessor 200 may employ pipeline optimization control logic 256 to make certain performance-optimizing comparisons by using the tag comparators 254 to compare the 3-bit tags in tag latches 232–238 rather than comparing the 27-bit data buffer addresses stored in the address latches 132–138 of the conventional microprocessor 100.

For example, assume a load operation coming down the pipeline whose load address is the same as the store address of a store operation that preceded the load operation, i.e., the load and store addresses match. In order to achieve data coherency, the microprocessor must insure that the load operation receives the data associated with the store operation rather than receiving the data currently in memory at the load address. In a conventional microprocessor, a solution is simply to stall the load operation at the stage where it would receive its load data and require all store operations to drain from the pipeline before allowing the matching load operation to proceed. This simple solution was chosen due to the timing problems introduced by the large amount of time that would have been required to compare many large (e.g., 27-bit) store addresses in the microprocessor and the large amount of integrated circuit real estate consumed by the large number of address comparators that would be required. A drawback of the conventional solution is that the load operation my remain stalled until all store operations drain even though the matching store may have been retired long before other stores have been retired resulting in the load being needlessly stalled beyond the completion of the matching store.

An alternative higher performing solution of the present invention is to employ tag comparators 254 to compare the load operation tag (e.g., the appropriate tag in the FB tag latches 236) with each store operation tag stored in the SB tag latches 232 each time a store operation is retired in the pipeline. As soon as the matching store operation is retired, then pipeline optimization control logic 256 allows the load operation to proceed. The optimizing comparisons are possible because the comparisons are small (e.g., only 3 bits on one embodiment of the present invention compared to 27 bits in the conventional scheme) and therefore fast, reducing the likelihood that the comparisons will cause timing problems.

Figure 3:
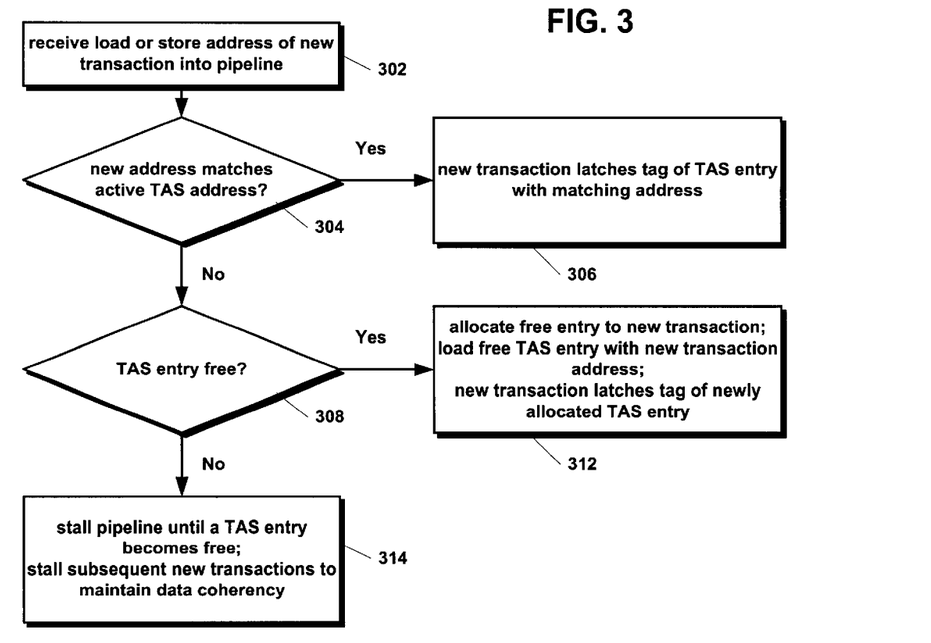
FIG. 3 is a flowchart illustrating operation of the microprocessor of FIG. 2 according to the present invention.

Referring now to FIG. 3, a flowchart illustrating operation of the microprocessor 200 of FIG. 2 according to the present invention is shown. Flow begins at block 302.

At block 302, address generator 106 generates new load/store address signal 146 as a new load or store transaction is received into the pipeline. Flow proceeds to decision block 304.

At decision block 304, control logic 218 determines whether new load/store address 146 matches any of the active TAS addresses 262 stored in TAS 252 based on the active/free information 272 and match signals 248 generated by address comparators 216. If so, flow proceeds to block 306. Otherwise, flow proceeds to decision block 308.

At block 306, control logic 218 generates the tag 276 of the TAS 252 entry with the matching address (i.e., of the one of the match signals 248 with a true value), and the new load or store transaction latches the matching tag 276. Flow ends at block 306.

At decision block 308, control logic 218 examines the active/free information 272 to determine whether TAS 252 has any free entries in which to store the new load/store address 146, since control logic 218 determined during block 304 that the new load/store address 146 is unique from the active TAS addresses 262. If TAS 252 has a free entry, then flow proceeds to block 312. Otherwise, flow proceeds to block 314.

At block 312, control logic 218 allocates a free entry in TAS 252 for the new transaction and loads the new load/store address 146 into the free TAS 252 entry. In particular, control logic 218 selects a free TAS 252 entry based on active/free information 272, generates the tag 276 of the free TAS 252 entry, and asserts the update signal 274 to load the new load/store address 146 into the selected TAS 252 entry. Control logic 218 also updates the active/free information 272 to mark the selected TAS 252 entry active. In addition, the new transaction latches the newly allocated tag 276. Flow ends at block 312.

At block 314, control logic 218 asserts stall signal 264 to stall the microprocessor 200 pipeline until a TAS 252 entry becomes free in order to maintain data coherency. Additionally, control logic 218 stalls any subsequent new load/store transactions until a TAS 252 entry becomes free. Flow ends at block 314.

Figure 4:
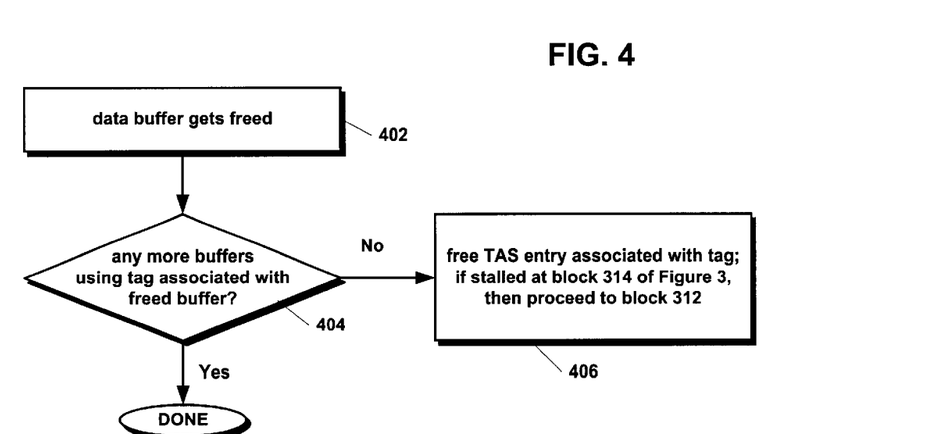
FIG. 4 is a flowchart illustrating operation of the microprocessor of FIG. 2 according to the present invention.

Referring now to FIG. 4, a flowchart illustrating operation of the microprocessor 200 of FIG. 2 according to the present invention is shown. Flow begins at block 402.

At block 402, one of data buffers 122–128 becomes free, typically due to a load or store transaction being retired. Flow proceeds to decision block 404.

At decision block 404, control logic 218 determines whether any more of the data buffers 122–128 are using the tag associated with the data buffer freed in block 402. If not, flow proceeds to block 406. Otherwise, flow ends.

At block 406, control logic 218 changes from active to free the active/free information 272 associated with the TAS 252 entry specified by the tag associated with the data buffer freed in block 402. Additionally, if control logic 218 is asserting the stall signal 264 per block 314, then control logic 218 proceeds to block 312 to allocate the newly freed TAS 252 entry for the stalled load/store transaction. Flow ends at block 406.

Figure 5:
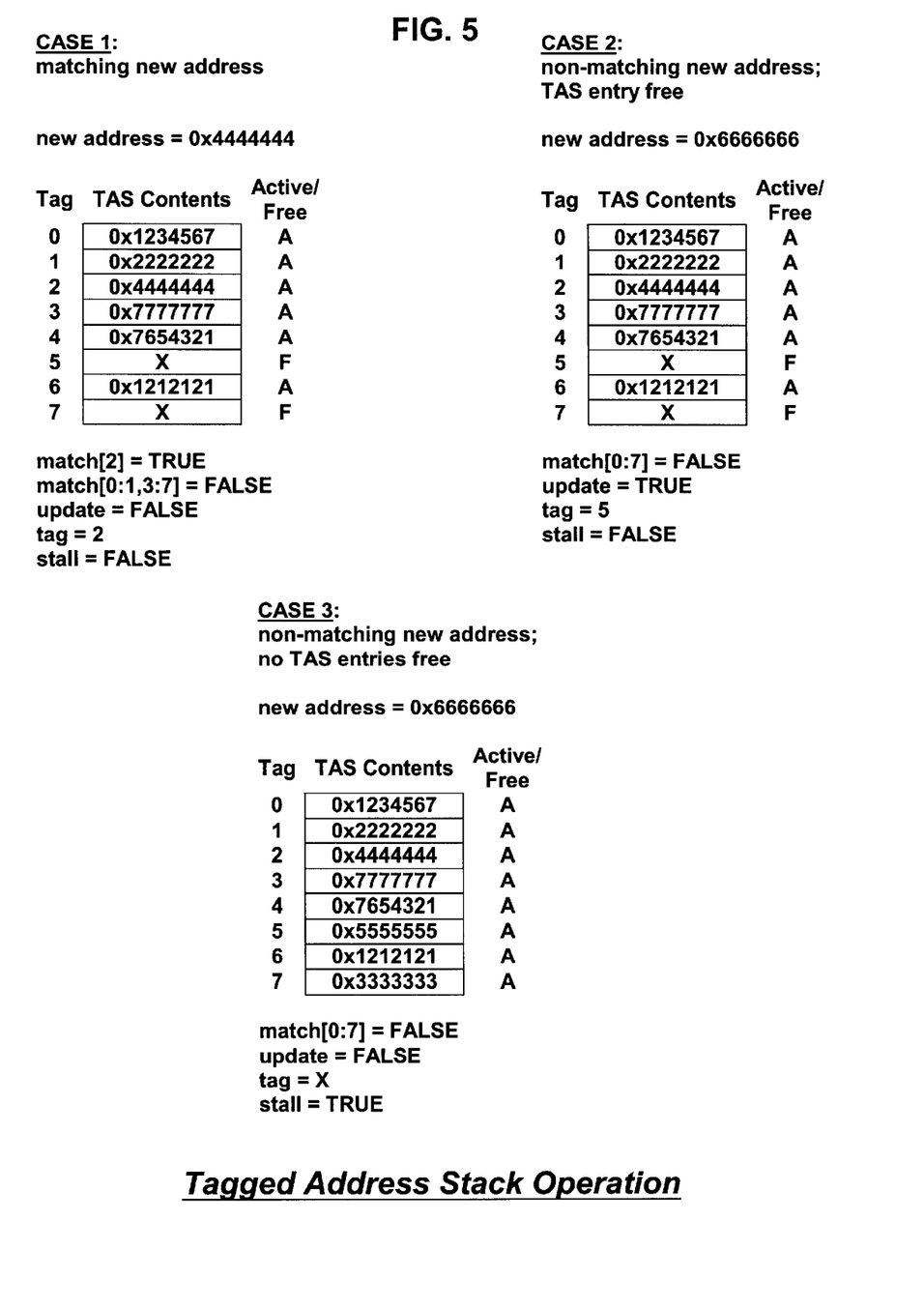
FIG. 5 is three tables illustrating operation of the microprocessor of FIG. 2 according to the present invention.

Referring now to FIG. 5, three tables illustrating operation of the microprocessor 200 of FIG. 2 according to the present invention are shown. The three tables show three examples, or cases, to illustrate operation of microprocessor 200. Case 1 illustrates operation of microprocessor 200 when a new load/store address 146 matches an active memory address stored in the TAS 252. Case 2 illustrates operation of microprocessor 200 when new load/store address 146 does not match any of the active addresses stored in the TAS 252 and a TAS 252 entry is free. Case 3 illustrates operation of microprocessor 200 when new load/store address 146 does not match any of the active addresses stored in the TAS 252 and no TAS 252 entries are free.

In case 1, the new load/store address 146 has a value of 0x4444444. TAS 252 entry 0 is active and holds the value 0x1234567. TAS 252 entry 1 is active and holds the value 0x2222222. TAS 252 entry 2 is active and holds the value 0x4444444. TAS 252 entry 3 is active and holds the value 0x7777777. TAS 252 entry 4 is active and holds the value 0x7654321. TAS 252 entries 5 and 7 are free. TAS 252 entry 6 is active and holds the value 0x1212121.

During block 302 of FIG. 3, address comparators 216 generate a true value on match signal[2] 248 and a false value on match signals[0:1,3:7] 248. During block 304, control logic 218 determines that new load/store address 146 matches active TAS 252 entry 2. During block 306, control logic 218 generates a binary value of b'010 on tag 276, and a false value on stall signal 264 and update signal 274.

In case 2, the new load/store address 146 has a value of 0x6666666. The TAS 252 has the same contents as in case 1. During block 302, address comparators 216 generate a false value on all match signals [0:7] 248. During block 304, control logic 218 determines that new load/store address 146 does not match any active TAS 252 entries. During block 308, control logic 218 determines that TAS 252 entry 5 is free. During block 312, control logic 218 generates a binary value of b'101 on tag 276 and a true value on update signal 274 to load new load/store address 146 into TAS 252 entry 5, and generates a false value on stall signal 264.

In case 3, the new load/store address 146 has a value of 0x6666666 as in case 2. The TAS 252 has the same contents as in cases 1 and 2, except that entry 5 has a value of 0x5555555 and entry 7 has a value of 0x3333333, and all the TAS 252 entries are active. During block 302, address comparators 216 generate a false value on all match signals [0:7] 248. During block 304, control logic 218 determines that new load/store address 146 does not match any active TAS 252 entries. During block 308, control logic 218 determines that no TAS 252 entries are free. During block 314, control logic 218 generates a false value on update signal 274 and a true value on stall signal 264 to stall the microprocessor 200 pipeline until a TAS 252 entry becomes free.

Although the present invention and its objects, features, and advantages have been described in detail, other embodiments are encompassed by the invention. For example, the size of the tagged address stack is scalable to the needs of a particular microprocessor. In particular, the number of latches in the TAS may be selected based on the number of data buffers in the microprocessor, the depth of the pipeline, whether the microprocessor is superscalar and the degree of scalability, as well as any other relevant factors. Additionally, the present invention is adaptable to data buffer addresses of varying size and granularity. Furthermore, the tag latches and tag comparators may be used to perform any number of pipeline optimizations.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus for reducing the number of address latches and address comparators needed to maintain data coherency in a microprocessor pipeline, the apparatus comprising:

a tagged address stack (TAS), having N latches for storing up to N unique addresses associated with data buffers in the pipeline, each of said N latches having an associated unique TAS tag;

N address comparators, coupled to said TAS, for indicating which if any of said N unique addresses matches a new address associated with a new data transaction in the pipeline; and control logic, coupled to said N address comparators, wherein if said N address comparators indicate said new address does not match any of said N unique addresses, then said control logic allocates a free one of said N latches to store said new address into, and causes said new data transaction to latch said unique TAS tag associated with said free one of said N latches allocated.

2. The apparatus of claim 1, wherein if said N address comparators indicate said new address matches one of said N unique addresses, said control logic causes said new data transaction to latch said unique TAS tag associated with one of said N latches storing said matching one of said N unique addresses.

3. The apparatus of claim 2, wherein said control logic stalls the pipeline if said N address comparators indicate said new address does not match any of said N unique addresses and none of said N latches is free.

4. The apparatus of claim 3, wherein said control logic frees one of said N latches when one of said N unique addresses stored in said one of said N latches is no longer used by any of said data buffers in the pipeline.

5. The apparatus of claim 1, wherein said unique TAS tag comprises substantially an order of magnitude fewer bits than each of said N unique addresses.

6. The apparatus of claim 5, further comprising:

a plurality of tag latches, coupled to said TAS, each associated with one of said data buffers, for storing said unique TAS tag associated with one of said N unique addresses stored in said TAS.

7. The apparatus of claim 6, further comprising:

a plurality of tag comparators, coupled to said plurality of tag latches, for comparing a plurality of said unique TAS tags stored in said plurality of tag latches.

8. The apparatus of claim 7, further comprising:

optimization control logic, coupled to said plurality of tag comparators, for performing pipeline transaction optimizations based on said tag comparators comparing said plurality of said unique TAS tags stored in said plurality of tag latches.

9. A microprocessor, comprising:

a plurality of data buffers, for storing data specified by load/store addresses;

a tag address stack (TAS), coupled to said plurality of data buffers, having N entries for storing N unique ones of said load/store addresses, wherein each of said N entries is identified by one of N unique tags;

a plurality of tag latches, coupled to said TAS, correspondent with said plurality of data buffers, each for storing one of said N unique tags; and a plurality of tag comparators, coupled to said plurality of tag latches, for comparing said N unique tags stored in said plurality of tag latches.

10. The microprocessor of claim 9, wherein said N entries is substantially less than said plurality of data buffers.

11. The microprocessor of claim 9, wherein a size of one of said N unique tags is substantially less than a size of one of said load/store addresses.

12. The microprocessor of claim 9, further comprising:

optimization logic, coupled to said plurality of tag comparators, for optimizing data transactions in the microprocessor involving said plurality of data buffers based on said plurality of tag comparators comparing said N unique tags stored in said plurality of tag latches.

13. The microprocessor of claim 9, further comprising:

control logic, coupled to said TAS, for maintaining information specifying whether each of said N TAS entries is active or free.

14. The microprocessor of claim 13, wherein said control logic determines whether a new load/store address matches an active one of said N unique load/store addresses stored in said TAS based on said information.

15. The microprocessor of claim 14, wherein if said new load/store address matches an active one of said N unique load/store addresses, then said control logic causes one of said N unique tags identifying one of said N entries storing said active matching one of said N unique load/store addresses to be stored into one of said plurality of tag latches.

16. The microprocessor of claim 15, wherein if said new load/store address does not match an active one of said N unique load/store addresses, then said control logic allocates a free one of said N entries and loads said new load/store address into said allocated free one of said N entries.

17. The microprocessor of claim 16, wherein said control logic causes one of said N unique tags identifying said allocated free one of said N entries to be stored into one of said plurality of tag latches.

18. The microprocessor of claim 17, wherein if said new load/store address does not match an active one of said N unique load/store addresses, and if none of said N entries are free, then said control logic generates a stall signal to stall execution of an operation associated with said new load/store address until one of said N entries becomes free.

19. The microprocessor of claim 14, further comprising:

a plurality of address comparators, coupled to said TAS, for comparing said new load/store address with said N unique ones of said load/store addresses to determine whether said new load/store address matches an active one of said N unique load/store addresses.

20. The microprocessor of claim 19, wherein said plurality of address comparators is substantially fewer than said plurality of data buffers.

21. A method for achieving data coherency in a microprocessor, the method comprising:

comparing a new memory address with a set of memory addresses, said set being a predetermined size, each of said memory addresses in said set being unique, and wherein a unique tag is associated with each location in said set;

stalling the microprocessor in response to said comparing, if said new memory address does not match any of said memory addresses in said set and all of said memory addresses are active;

inserting said new memory address into said set in response to said comparing, if said new memory address does not match any of said memory addresses in said set but at least one of said memory addresses is not active; and binding to said new memory address said unique tag associated with said location in said set of a matching one of said memory addresses in response to said comparing, if said new memory address matches one of said memory addresses.

22. The method of claim 21, wherein said predetermined size of said set is substantially smaller than a number of data buffers in the microprocessor for storing data specified by said set of memory addresses.

23. The method of claim 21, further comprising:

unstalling the microprocessor in response to one of said memory addresses in said set becoming inactive.

24. The method of claim 21, further comprising:

binding said unique tag associated with said location in which said new memory address is inserted into said set, after said inserting.

25. The method of claim 21, further comprising:

inactivating one of said memory addresses in said set in response to freeing of a data buffer for storing data specified by said one of said memory addresses, if no other data buffers are using said unique tag associated with said one of said memory addresses to be inactivated.

26. The method of claim 21, wherein said binding comprises storing said unique tag into a latch in the microprocessor associated with a data buffer for storing data specified by said new memory address.

27. The method of claim 21, wherein said stalling comprises stalling a data transaction associated with said new memory address.

28. The method of claim 27, wherein said stalling comprises stalling data transactions subsequent to said data transaction associated with said new memory address.

29. A microprocessor having M data buffers for storing data associated with data transfer operations to or from a memory address, comprising:

an array of N address latches, shared in common by the M data buffers, for storing N unique memory addresses associated with the data transfer operations, wherein N is substantially smaller than M;

N address comparators, coupled to said array, for comparing said N unique memory addresses with a new memory address of a new data transfer operation; and control logic, coupled to said N address comparators, for stalling said new data transfer operation until one of said N address latches in said array becomes free, if said control logic determines from said N address comparators that said new memory address is an N+1th unique memory address.

30. The microprocessor of claim 29, further comprising:

M tag latches, coupled to corresponding ones of the M data buffers, each for storing an index of said array specifying which of said N address latches contains one of said N unique memory addresses specifying data in a corresponding one of the M data buffers.

31. The microprocessor of claim 30, wherein said control logic is further configured to cause said index to be stored into one of said M tag latches.

32. The microprocessor of claim 31, wherein said index stored into one of said M tag latches is an index of a free one of said N address latches in said array if said N address comparators indicate said new memory address does not match any of said N unique memory addresses stored in said array.

33. The microprocessor of claim 32, wherein said control logic loads said new memory address into said array at said index if said N address comparators indicate said new memory address does not match any of said N unique memory addresses stored in said array.

34. The microprocessor of claim 32, wherein said index stored into said M tag latches is an index of a matching active one of said N address latches in said array if said N address comparators indicate said new memory address matches one of said N unique memory addresses stored in said array.

* * * * *